United States Patent
Ikeda et al.

(10) Patent No.: US 8,011,178 B2
(45) Date of Patent: Sep. 6, 2011

(54) METHOD FOR CONTROLLING EXHAUST GAS PURIFICATION SYSTEM AND EXHAUST GAS PURIFICATION SYSTEM

(75) Inventors: Shigeru Ikeda, Fujisawa (JP); Takashi Ikeda, Fujisawa (JP); Takao Onodera, Fujisawa (JP); Tatsuo Mashiko, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 719 days.

(21) Appl. No.: 11/992,538

(22) PCT Filed: Sep. 13, 2006

(86) PCT No.: PCT/JP2006/318173
§ 371 (c)(1),
(2), (4) Date: Mar. 25, 2008

(87) PCT Pub. No.: WO2007/049406
PCT Pub. Date: May 3, 2007

(65) Prior Publication Data
US 2009/0235647 A1    Sep. 24, 2009

(30) Foreign Application Priority Data

Oct. 25, 2005 (JP) .................................. 2005-309864

(51) Int. Cl.
*F01N 3/00* (2006.01)
(52) U.S. Cl. ................. 60/286; 60/295; 60/297; 60/311
(58) Field of Classification Search .................... 60/286, 60/295, 297, 300, 311
See application file for complete search history.

(56) References Cited

U.S. PATENT DOCUMENTS

| | | | |
|---|---|---|---|
| 6,763,659 B2 * | 7/2004 | Watanabe et al. | 60/297 |
| 2002/0078684 A1 * | 6/2002 | Carberry et al. | 60/295 |
| 2004/0020194 A1 * | 2/2004 | Nishimura et al. | 60/297 |
| 2004/0144069 A1 | 7/2004 | Gabe et al. | |
| 2004/0194450 A1 * | 10/2004 | Tanaka et al. | 60/285 |
| 2004/0226284 A1 * | 11/2004 | Kitahara et al. | 60/285 |

(Continued)

FOREIGN PATENT DOCUMENTS

JP    2003-155917    5/2003
(Continued)

OTHER PUBLICATIONS

International Search Report got PCT Application PCT/JP2006/318173 filed on Sep. 13, 2006, mailed on Dec. 19, 2006.

*Primary Examiner* — Thomas Denion
*Assistant Examiner* — Patrick Maines
(74) *Attorney, Agent, or Firm* — Staas & Halsey LLP

(57) ABSTRACT

In regeneration control in a manual regeneration mode, when a first exhaust gas temperature of an exhaust gas flowing into an oxidation catalyst device is higher than a predetermined determining temperature and an exhaust gas temperature flowing into a DPF device is higher than a predetermined determining temperature and when an intake temperature becomes higher than a predetermined third determining temperature, second exhaust gas temperature control carrying out post injection in addition to multi injection is stopped and switched to third exhaust gas temperature rise control carrying out the post injection in addition to normal injection. Thus, temperature rise of an engine cooling water can be restricted without stopping an air conditioner, and possible overheating of the engine can be prevented.

4 Claims, 2 Drawing Sheets

U.S. PATENT DOCUMENTS

2005/0044845 A1    3/2005    Takao et al.

FOREIGN PATENT DOCUMENTS

| JP | 2003155917 A | * | 5/2003 |
| JP | 2004-225579 | | 8/2004 |
| JP | 2004-346755 | | 12/2004 |
| JP | 2004346755 A | * | 12/2004 |
| JP | 2005-076604 | | 3/2005 |
| JP | 2005-171841 | | 6/2005 |

* cited by examiner

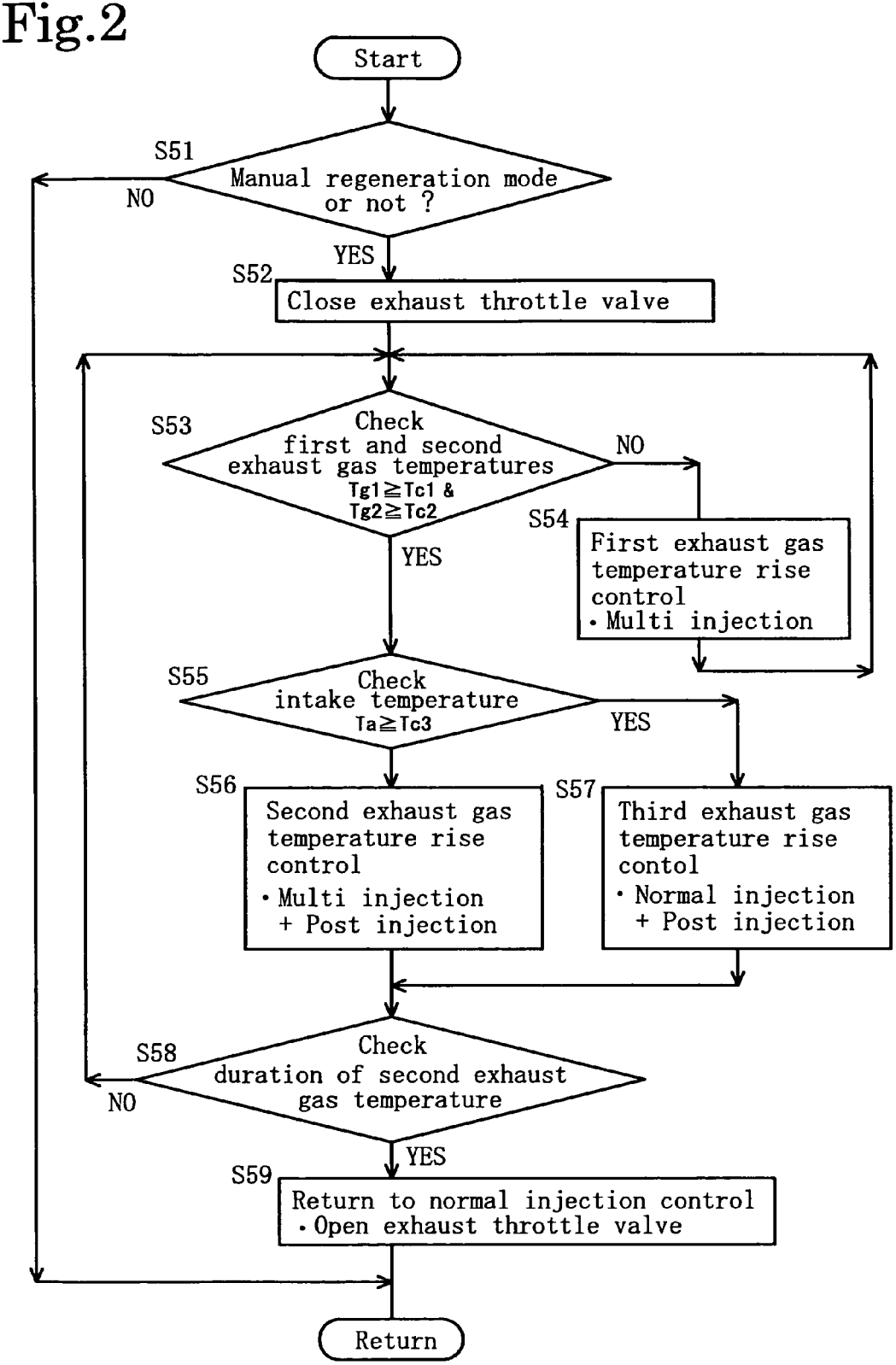

METHOD FOR CONTROLLING EXHAUST GAS PURIFICATION SYSTEM AND EXHAUST GAS PURIFICATION SYSTEM

CROSS-REFERENCE TO RELATED APPLICATIONS

This application claims the benefit under 35 U.S.C Section 237, of PCT International application Number PCT/JP2006/318173 filed on Sep. 13, 2006, published as WO 2007/049406 on May 3, 2007 and Japanese Patent Application JP2005-309864 filed Oct. 25, 2005, contents of which are incorporated herein by reference.

BACKGROUND OF THE INVENTION

1. Technical Field

The present invention relates to a method for controlling an exhaust gas purification system and the exhaust gas purification system for carrying out regeneration control including exhaust gas temperature rise control with post injection in order to recover the purification capacity of an exhaust gas purification device provided with a DPF for purifying components in the exhaust gas for an internal combustion engine such as diesel engines.

2. Background Art

Regulations on emissions of particulate matter (PM: particulate matter: hereinafter, referred to as the PM) as well as NOx, CO, HC and the like exhausted from diesel engines have been tightened year by year. Technologies have been developed in which a filter called as a diesel particulate filter (DPF: Diesel Particulate Filter: hereinafter, referred to as the DPF) traps the PM to reduce the PM amount exhausted to the outside. A continuous regeneration type DPF device carrying a catalyst are among them.

In this continuous regeneration type DPF device, when an exhaust gas temperature is approximately 350° C. or above, the PM trapped by the filter is continuously burned and purified, and the filter is self-regenerated. However, when the exhaust temperature is low, for example, when the sate in a low exhaust temperature is continued such as in cases of an idling operation, a low-load/low-speed operation or the like of the internal combustion engine, the exhaust gas temperature is low and a temperature of a catalyst is lowered and not activated, and thus, oxidization reaction is not promoted. Then, it becomes difficult to oxidize the PM and to regenerate the filter. As a result, the accumulation of the PM on the filter continues and the clogging of the filter progresses, resulting in a problem of exhaust pressure rise due to the clogging of the filter.

One method to solve such a problem is regeneration control for forcedly burning and removing the trapped PM by forcedly raising the temperature of the exhaust gas when the clogging of the filter exceeds a predetermined amount. Methods for detecting the clogging of the filter include a detection method using a differential pressure before and after the filter and a detection method by calculating a trapped PM amount from an engine operation state using a preset map data and the like so as to acquire an accumulated amount of the PM.

In this regeneration control, the exhaust gas temperature rise control is executed so that the temperature of the exhaust gas flowing into the filter may be raised to not less than a temperature at which the PM trapped by the filter is burned. Thus, the filter temperature is raised and the PM is burned and removed so that the filter is regenerated.

This kind of exhaust gas temperature rise control includes methods carrying out multiple injection (multi-stage delayed injection) or post injection in-cylinder fuel injection as described in Japanese patent application Kokai publication No. 2003-155917, Japanese patent application Kokai publication No. 2005-171841, Japanese patent application Kokai publication No. 2005-76604, and Japanese patent application Kokai publication No. 2004-225579, for example.

The multi injection is a delayed multi-stage injection in which the fuel in the cylinder is burned in many stages. By the multi injection, a fuel amount burned without work in the cylinder is increased, and the temperature of the exhaust gas exhausted from the cylinder, that is, the temperature of the exhaust gas flowing into an oxidation catalyst device can be raised to not less than a catalyst activation temperature of the oxidation catalyst. The post injection is injection for auxiliary injection at timing further delayed from the multi injection after main injection in the in-cylinder injection. By the post injection, HC (hydrocarbon) is increased in the exhaust gas exhausted from the cylinder and the HC is burned by the oxidation catalyst, by which the temperature of the exhaust gas on a downstream of the oxidation catalyst device can be raised.

On the other hand, in view of a measure against oil dilution that an unburned fuel is mixed with engine oil (lubrication oil) by the post injection and dilutes the engine oil, there is a control of forced regeneration executed during parking and idling in which the operation state is stable. In this control, when a predetermined amount of the PM is accumulated in the filter device, need for regeneration control of the filter device is notified to an operator (driver) by an alarm lamp or the like. When the driver having received the notification stops the vehicle and presses a manual regeneration button, a manual regeneration mode is started and the forced regeneration is operated.

In this system, by installing the oxidation catalyst device on a front stage (upstream side) of the filter device and by burning the HC supplied into the exhaust gas by the post injection in the oxidation catalyst device, the temperature of the exhaust gas at an inlet of the filter device is raised, thus executing the forced regeneration.

In this exhaust gas temperature rise, first, when the temperature of the exhaust gas is low as in the low-speed/low-load operating state, the multi injection is carried out for raising the exhaust gas temperature flowing into the oxidation catalyst device to the catalyst activation temperature of the oxidation catalyst. After the exhaust gas temperature has been raised, the exhaust gas temperature is kept at the catalyst activation temperature or above by the in-cylinder fuel injection control in which post injection is used in addition to the multi injection, while the post injection is executed and the HC is supplied to the oxidation catalyst device. Since the HC is oxidized by the oxidation catalyst to generate heat, the exhaust gas flows into the filter device with the temperature further raised. By the exhaust gas having a high temperature, the PM accumulated in the filter device is burned and removed.

However, in this manual regeneration control, since the vehicle is in a parked state, a cooling effect for the engine by a radiator is low. Thus, a temperature of a cooling water of the engine rises. Particularly, when heat radiated from a radiation portion of an air conditioner affects the radiator due to an arrangement relation between the radiation portion of the air conditioner and the radiator of the engine, it is highly likely that overheat of the engine may be caused when manual regeneration and use of the air conditioner are carried in the same time.

Then, a measure of stopping the operation of the air conditioner during the manual regeneration is employed, but that gives a sense of discomfort to a driver in summer, resulting in a problem that merchantability is extremely lowered.

SUMMARY OF THE INVENTION

An object of the present invention is to provide a method for controlling an exhaust gas purification system and the exhaust gas purification system provided with a DPF device for purifying PM in an exhaust gas in an internal combustion engine such as diesel engines, in which rise in a temperature of an engine cooling water can be restricted without stopping an air conditioner in exhaust gas temperature rise control during manual regeneration of the DPF device and overheating of the engine can be avoided.

In order to achieve the above-mentioned object, a method for controlling an exhaust gas purification system of the present invention includes: in an exhaust gas purification system having an exhaust gas purification device provided with an oxidation catalyst device and a diesel particulate filter device provided in order from a upstream side of an exhaust passage of an internal combustion engine, temperature detecting means for detecting a temperature of an exhaust gas and an intake temperature, and regeneration control means for carrying out regeneration control accompanied by post injection in the in-cylinder fuel injection control based on a detection result of the temperature detecting means in order to recover purification capacity of the diesel particulate filter device; executing a first exhaust gas temperature rise control carrying out multi injection in the in-cylinder fuel injection control is when a first exhaust gas temperature of the exhaust gas flowing into the oxidation catalyst device is lower than a predetermined first determining temperature or when a second exhaust gas temperature of the exhaust gas flowing into the diesel particulate filter device is lower than a predetermined second determining temperature in the exhaust gas temperature rise control during the regeneration control in manual regeneration; executing a second exhaust gas temperature rise control carrying out post injection in addition to the multi injection in the in-cylinder fuel injection control when the first exhaust gas temperature is higher than the predetermined first determining temperature and the second exhaust gas temperature is higher than the predetermined second determining temperature and when the intake temperature is lower than a predetermined third determining temperature; , and executing third exhaust gas temperature rise control carrying out the post injection in addition to normal injection in the in-cylinder fuel injection control when the first exhaust gas temperature is higher than the predetermined first determining temperature and the second exhaust gas temperature is higher than the predetermined second determining temperature and when the intake temperature is higher than a predetermined third determining temperature.

The multi injection here means fuel injection carried out in multi stages at timing delayed from the normal injection, thereby raising the exhaust temperature.

The post injection means fuel injection carried out at timing further delayed from the multi injection. By the post injection, the injected fuel becomes HC without burning, and the HC is supplied into the exhaust gas.

The normal injection is fuel injection carried out at a normal operation other than the exhaust temperature rise control. In the regeneration control method for the exhaust gas purification system, the first determining temperature is a catalyst activation temperature of the oxidation catalyst carried by the oxidation catalyst device, the second determining temperature is a predetermined temperature for prohibiting the post injection in the exhaust gas temperature rise control at the regeneration control, and the third determining temperature is the intake temperature at which the second exhaust gas temperature cannot be kept higher than the predetermined second determining temperature when the second exhaust gas temperature rise control is switched to the third exhaust gas temperature rise control.

In the present invention, during the regeneration control, when the exhaust gas temperature is low as in a low-speed low-load operating state, the first exhaust gas temperature rise control of the multi injection (multi-stage injection) is carried out. By this, the temperature of the exhaust gas exhausted from the cylinder, that is, the first exhaust gas temperature that is the exhaust gas temperature flowing into the oxidation catalyst device is raised to the predetermined first determining temperature that is the catalyst activation temperature of the oxidation catalyst or the like.

When the second exhaust gas temperature, that is the temperature of the exhaust gas flowing into the DPF device, is lower than the predetermined second determining temperature, that is the temperature to prohibit post injection, white smoke is exhausted during the post injection at this temperature or below. Thus, in order to raise the second exhaust gas temperature, the multi injection is continued.

Even when the second exhaust gas temperature is higher than the predetermined second determining temperature, when the first exhaust gas temperature is lower than the predetermined first determining temperature (immediately after deceleration, for example), the post injection will cause white smoke to exhaust. Thus, in order to raise the first exhaust gas temperature, the multi injection is continued.

When the first exhaust gas temperature is higher than the predetermined first determining temperature and the second exhaust gas temperature is higher than the predetermined second determining temperature and when the intake temperature is higher than the predetermined third determining temperature, the second exhaust gas temperature rise control carrying out the multi injection is stopped, and the control is switched to the third exhaust gas temperature rise control carrying out the normal injection and the post injection.

In the third exhaust gas temperature rise control, since the multi injection is not carried out in the normal injection plus post injection, thereby restricting rise of the exhaust gas temperature exhausted from the cylinder, rise of the engine cooling water temperature can be restricted. On the other hand, since the HC is supplied into the exhaust gas by using the post injection at the same time, the HC is oxidized by the oxidation catalyst to generate heat, and the exhaust gas temperature is further raised. The PM accumulated in the filter is heated to not less than a temperature to start burning the PM by the exhaust gas having a high temperature, and the PM is burned and removed.

However, even though the first exhaust gas temperature is higher than the first determining temperature and the second exhaust gas temperature is higher than the second determining temperature, when the intake temperature is low and even lower than the predetermined third determining temperature, switch from the second exhaust gas temperature rise control to the third exhaust gas purification control will cause to stop the multi injection to lower the first exhaust gas temperature and the second exhaust gas temperature, leading to difficulties in burning of the PM and insufficient forced regeneration. In order to avoid this, even when the first exhaust gas temperature is higher than the first determining temperature and the second exhaust gas temperature is higher than the second determining temperature, when the intake temperature is lower than the predetermined third determining temperature, the second exhaust gas temperature rise control is executed.

That is, when the first exhaust gas temperature is higher than the predetermined first determining temperature and the second exhaust gas temperature is higher than the predetermined second determining temperature and when the intake temperature is lower than the predetermined third determining temperature, the post injection is carried out in addition to the multi injection. Thus, the HC is supplied into the exhaust gas while the exhaust temperature is being raised, the HC is oxidized by the oxidation catalyst device to further raise the temperature of the exhaust gas and supply the exhaust gas to the DPF device, thereby burning and removing the PM in the DPF device.

By this control, excessive rise of the exhaust gas temperature exhausted to the exhaust passage can be restricted, and the temperature rise of the engine cooling water can be restricted without stopping the air conditioner. By this, overheat of the engine can be prevented.

The exhaust gas purification system of the present invention in order to achieve the above-mentioned object is configured such that an exhaust gas purification system includes an exhaust gas purification device provided with an oxidation catalyst device and a diesel particulate filter device in order from a upstream side in an exhaust passage of an internal combustion engine, temperature detecting means for detecting a temperature of an exhaust gas and an intake temperature, and regeneration control means for regeneration control accompanied by post injection in in-cylinder fuel injection control based on a detection result of the temperature detecting means in order to recover purification capacity of the diesel particulate filter device; the regeneration control means executing, in the exhaust gas temperature rise control in the regeneration control during manual regeneration, first exhaust gas temperature rise control carrying out multi injection in the in-cylinder fuel injection control when a first exhaust gas temperature of an exhaust gas flowing into the oxidation catalyst device is lower than a predetermined first determining temperature or a second exhaust gas temperature of the exhaust gas flowing into the diesel particulate filter device is lower than a predetermined second determining temperature; the regeneration control means executing second exhaust gas temperature rise control carrying out post injection in addition to the multi injection in the in-cylinder fuel injection control when the first exhaust gas temperature is higher than the predetermined first determining temperature and the second exhaust gas temperature is higher than the predetermined second determining temperature and when the intake temperature is lower than a predetermined third determining temperature; and the regeneration control means executing third exhaust gas temperature rise control carrying out the post injection in addition to normal injection in the in-cylinder fuel injection control when the first exhaust gas temperature is higher than the predetermined first determining temperature and the second exhaust gas temperature is higher than the predetermined second determining temperature and when the intake temperature is higher than the predetermined third determining temperature.

The exhaust gas purification system is configured such that the first determining temperature is a catalyst activation temperature of the oxidation catalyst carried by the oxidation catalyst device, the second determining temperature is a predetermined temperature to prohibit the post injection in the exhaust gas temperature rise control in the regeneration control, and the third determining temperature is the intake temperature at which the second exhaust gas temperature cannot be kept higher than the predetermined second determining temperature when the second exhaust gas temperature rise control is switched to the third exhaust gas temperature rise control.

By the above-mentioned configurations, the exhaust gas purification system that can execute the method for controlling the exhaust gas purification system mentioned above can be provided, and the same working effects can be exerted.

According to the method for controlling the exhaust gas purification system and the exhaust gas purification system of the present invention, in the exhaust gas purification system having the exhaust gas purification device provided with the oxidation catalyst device and the DPF device for purifying PM in exhaust gas in the exhaust passage of the internal combustion engine such as diesel engines, the following effects can be exerted in the exhaust gas temperature rise control of regeneration control in the manual regeneration mode for recovering purification capacity of the DPF device.

When the temperature of the exhaust gas flowing into the oxidation catalyst device is at the predetermined first determining temperature or above and the temperature of the exhaust gas flowing into the DPF device is at the predetermined second determining temperature or above and when the intake temperature is at the predetermined third determining temperature or above, the second exhaust gas temperature rise control carrying out the post injection in addition to the multi injection is stopped, and the third exhaust gas temperature rise control carrying out the post injection in addition to the normal injection is executed. As a result, temperature rise of the engine cooling water is restricted and the DPF device can be forcedly regenerated while preventing overheating of the engine. Therefore, it is not necessary to stop the air conditioner during the manual regeneration.

BRIEF DESCRIPTION OF THE DRAWINGS

FIG. 2 is a diagram illustrating an example of a regeneration control flow of a manual regeneration mode.

DESCRIPTION OF EMBODIMENTS

Figure 1:
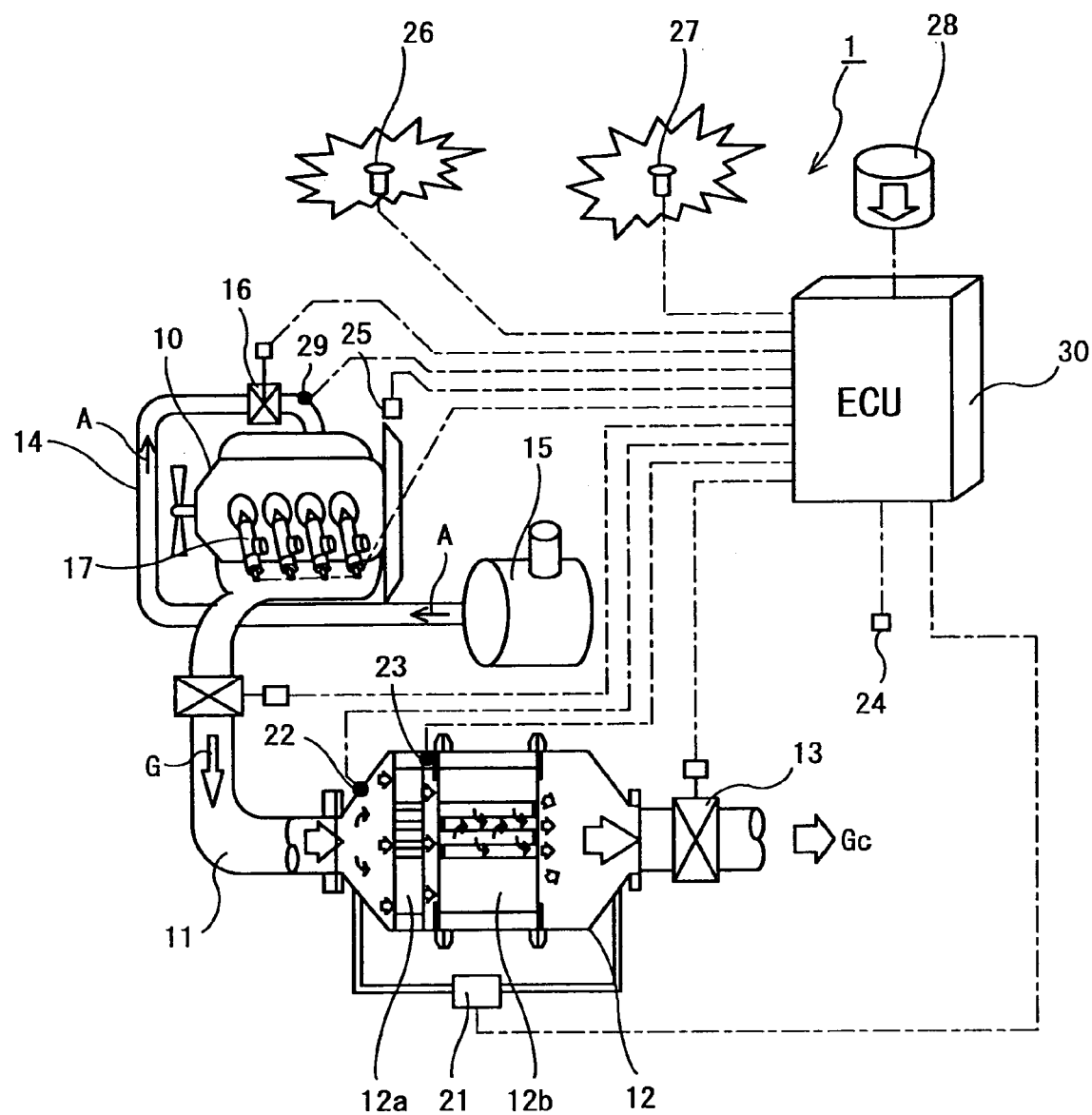
FIG. 1 is a system block diagram of an exhaust gas purification system of an embodiment according to the present invention.

Hereinafter, a method for controlling an exhaust gas purification system and the exhaust gas purification system of an embodiment according to the present invention will be described referring to the attached drawings.

FIG. 1 illustrates a configuration of an exhaust gas purification system 1 of the present embodiment. The exhaust gas purification system 1 includes an exhaust gas purification device 12 provided at an exhaust passage 11 of a diesel engine (internal combustion engine) 10. The exhaust gas purification device 12 is one of continuous regeneration type DPF (diesel particulate filter) devices and has an oxidation catalyst device 12a on an upstream side and a filter device 12b with a catalyst on a downstream side. On the downstream side of the exhaust gas purification device 12, an exhaust throttle valve (exhaust throttle) 13 is provided.

The oxidation catalyst device 12a is formed by having an oxidation catalyst such as platinum (Pt) carried by a carrier such as a porous ceramic honeycomb structure. The filter device 12b with the catalyst is formed by a monolith-honeycomb wall-flow type filter in which inlets and outlets of channels of a porous ceramic honeycomb are alternately sealed, or a felt-like filter or the like in which inorganic fibers such as alumina are laminated at random. A catalyst such as platinum, cerium oxide or the like is carried by the filter portion.

When a monolith-honeycomb wall-flow type filter is employed for the filter device 12b with the catalyst, PM (particulate matter) in an exhaust gas G is trapped by a porous ceramic wall, while when the fiber filter type is employed, the PM is trapped by the inorganic fibers in the filter.

In order to estimate an accumulated amount of the PM in the filter device 12b with catalyst, a differential pressure sensor 21 is provided at a conduit connected to front and back portions of the exhaust gas purification device 12. For regeneration control of the filter device 12b with the catalyst, an oxidation-catalyst inlet exhaust-temperature sensor 22 is provided on the upstream side of the oxidation catalyst device 12a and a filter inlet exhaust-temperature sensor 23 between the oxidation catalyst device 12a and the filter device 12b with the catalyst, respectively.

This oxidation-catalyst inlet exhaust-temperature sensor 22 detects a first exhaust gas temperature Tg1 that is a temperature of the exhaust gas flowing into the oxidation catalyst device 12a. The filter inlet exhaust-temperature sensor 23 detects a second exhaust gas temperature Tg2 that is a temperature of the exhaust gas flowing into the filter device 12b with the catalyst.

Moreover, in an intake passage 14, an air cleaner 15, an intake throttle valve 16, an intake temperature sensor 29 for detecting an intake temperature Ta and the like are provided. The intake throttle valve 16 adjusts an amount of an intake A into an intake manifold.

Output values of these sensors are inputted to a controller (ECU: Engine Control Unit) 30 for general control of operation of the engine 10 as well as regeneration control of the exhaust gas purification device 12. By control signals outputted from the controller 30, the intake throttle valve 16, a fuel injection device (injection nozzle) 17, an EGR valve provided at an EGR passage, not shown, with an EGR cooler for adjusting an EGR amount and the like are controlled.

The fuel injection device 17 is connected to a common rail injection system (not shown) for temporarily reserving a high-pressure fuel whose pressure has been raised by a fuel pump (not shown). Into the controller 30, information such as a vehicle speed, a temperature of a cooling water and the like in addition to information such as an acceleration opening from an accelerator position sensor (APS) 24, an engine speed from a engine speed sensor 25 and the like are inputted for operation of the engine. The controller 30 outputs an energizing time signal so that a predetermined amount of fuel is injected from the fuel injection device 17.

In the regeneration control of the exhaust gas purification device 12, a flashing lamp (DPF lamp) 26 and an alarm lamp 27 for drawing attention, and a manual regeneration button (manual regeneration switch) 28 are provided so that a driver can arbitrarily stop a vehicle for forced regeneration not only by automatic forced regeneration during driving. About this drawing attention, the attention is drawn from an operator (driver) when a trapped amount of PM in the filter device 12b with the catalyst exceeds a given amount and the filter device 12b with the catalyst is clogged.

In the control of the exhaust gas purification system 1, PM is trapped in a normal operation. In the normal operation, whether it is regeneration timing or not is monitored, and when it is determined as the regeneration timing, an alarm is sent or running automatic regeneration is carried out.

The manual regeneration according to the present invention is used together with the running automatic regeneration in which forced regeneration is executed during running of the vehicle, and selection and execution is performed as appropriate based on a traveling distance or a value of a DPF differential pressure. The present invention is configured to carry out the following control in the regeneration control in a manual regeneration mode started by operation of the manual regeneration button 28 by the driver having received the alarm.

In the regeneration control in the manual regeneration mode, when a differential pressure $\Delta Pm$ detected by the differential pressure sensor 21 arranged in the front and back portions of the exhaust gas purification device 12 exceeds a predetermined value $\Delta P1$, the flashing lamp 26 is flashed to prompt the driver for regeneration of the DPF. When the vehicle is stopped by the driver having received the prompt and the manual regeneration button 28 is pressed, that is, upon receipt of a regeneration start instruction by the driver, the control is started.

In the present invention, the forced regeneration in the manual regeneration mode is carried out according to a control flow as exemplified in FIG. 2. When the control flow is started, at Step S51, it is determined whether the mode is the manual regeneration mode or not. When it is not the manual regeneration mode, the forced regeneration is not performed and the routine goes to return. When it is the manual regeneration mode, the routine goes to Step S52. Whether it is the manual regeneration mode or not can be determined by using a manual regeneration mode flag, for example, with the flag being 1 as the manual regeneration mode and 0 (zero) as not the manual regeneration mode and by checking whether this flag is 1 or 0 (zero) at Step S51.

At Step S52, the exhaust throttle valve 13 is closed. By this exhaust throttle control, heat escape is prevented and heat-retaining property of the DPF is improved. At subsequent Step S53, the first exhaust gas temperature Tg1 and the second exhaust gas temperature Tg2 are checked. When the first exhaust gas temperature Tg1 that is an exhaust gas temperature detected by the oxidation-catalyst inlet exhaust-temperature sensor 22 is lower than a predetermined first determining temperature Tc1, or the second exhaust gas temperature Tg2 that is an exhaust gas temperature detected by the filter inlet exhaust-temperature sensor 23 is lower than a predetermined second determining temperature Tc2, the first exhaust gas temperature rise control carrying out the multi injection is performed for a predetermined time (time relating to a check interval of the first exhaust gas temperature Tg1) at Step S54. After that, the routine returns to Step S53.

The predetermined first determining temperature Tc1 is a temperature at which a temperature of the oxidation catalyst of the oxidation catalyst device 12a is not less than a catalyst activation temperature when the first exhaust gas temperature Tg1 reaches this temperature, and usually, the catalyst activation temperature of the oxidation catalyst is set as a value of the predetermined first determining temperature Tc1.

The predetermined second determining temperature Tc2 is a predetermined temperature to prohibit the post injection. When the second exhaust gas temperature Tg2 reaches this temperature Tc2 or below, white smoke is exhausted. Thus, the predetermined second determining temperature Tc2 is a temperature at which the post injection is disabled, in other words, the temperature to prohibit or stop the post injection.

When the first exhaust gas temperature Tg1 is at the predetermined first determining temperature Tc1 or above and the second exhaust gas temperature Tg2 is at the predetermined second determining temperature Tc2 or above, the routine goes to Step S55, where the intake temperature Ta is checked. Here, it is determined when the intake temperature Ta detected by the intake temperature sensor 29 is at the predetermined third determining temperature Tc3 or above.

The third determining temperature Tc3 is an intake temperature at which the second exhaust gas temperature Tg2 cannot be kept higher than the predetermined second determining temperature Tc2 when the second exhaust gas temperature rise control is switched to the third exhaust gas temperature rise control.

When the intake temperature Ta is lower than the predetermined third determining temperature Tc3 at the determination at Step S55, the second exhaust gas temperature rise control carrying out the post injection in addition to the multi injection in the in-cylinder injection of the engine 10 is executed for a predetermined time (time relating to a check interval of each temperature) at Step S56. After that, the routine goes to Step S58.

When the intake temperature Ta is at the predetermined third determining temperature Tc3 or above at the determination at Step S55, the third exhaust gas temperature rise control carrying out the post injection in addition to the normal injection in the in-cylinder (in the cylinder) injection of the engine 10 is executed for the predetermined time (time relating to a check interval of each temperature) at Step S57. And then, the routine goes to Step S58.

At Step S58, a duration time of the second exhaust gas temperature Tg2 is checked. At this check, it is checked whether the time during which the second exhaust gas temperature Tg2 is at a predetermined fourth determining temperature Tc4 or above exceeds a predetermined determination duration time or not. That is, when the predetermined determination duration time is exceeded, it is decided that the forced regeneration is completed, and the routine goes to Step S59. When the predetermined determination duration time is not exceeded, it is decided that the forced regeneration is not completed, the routine returns to Step S53, and until the time during which the second exhaust gas temperature Tg2 is at the predetermined fourth determining temperature Tc4 or above exceeds the predetermined determination duration time, the first exhaust gas temperature rise control at Step S54, the second exhaust gas temperature rise control at Step S56 or the third exhaust gas temperature rise control at Step S57 is executed.

The predetermined fourth determining temperature Tc4 is a temperature at which the PM trapped by the filter device 12b with the catalyst continues to burn when the second exhaust gas temperature Tg2 is at this temperature. Usually, the temperature to start burning the PM is set as a value of the predetermined fourth determining temperature Tc4.

At Step S59, the control returns to the normal injection control, the exhaust throttle valve 13 is opened, the regeneration control in the manual regeneration mode is finished, and then, the routine goes to return.

The following control is enabled by this forced regeneration by the manual regeneration mode.

When the first exhaust gas temperature Tg1 that is the temperature of the exhaust gas detected by the oxidation-catalyst inlet exhaust-temperature sensor 22 is lower than the predetermined first determining temperature Tc1, or when the second exhaust gas temperature Tg2 that is the temperature of the exhaust gas detected by the filter inlet exhaust-temperature sensor 23 is lower than the predetermined second determining temperature Tc2, by executing the first exhaust gas temperature rise control carrying out the multi injection in the in-cylinder injection control of the engine 10, the first exhaust gas temperature Tg1 can be raised to the predetermined first determining temperature Tc1 and the second exhaust gas temperature Tg2 to the predetermined second determining temperature Tc2.

After that, when the first exhaust gas temperature Tg1 is higher than the predetermined first determining temperature Tc1 and the second exhaust gas temperature Tg2 is higher than the predetermined second determining temperature Tc2 but the intake temperature Ta detected by the intake temperature sensor 29 is lower than the predetermined third determining temperature Tc3, by executing the second exhaust gas temperature rise control carrying out the post injection in addition to the multi injection in the in-cylinder injection control of the engine 10, the second exhaust gas temperature Tg2 can be raised to the predetermined fourth determining temperature Tc4 or kept at the predetermined fourth determining temperature Tc4 or above.

Thus, when the intake temperature Ta is low and lower than the predetermined third determining temperature Tc3, the second exhaust gas temperature rise control is switched to the third exhaust gas purification control. By stopping the multi injection and switching to the normal injection, it is possible to avoid difficulties in burning of the PM insufficient forced regeneration caused by falls in the first exhaust gas temperature Tg1 and the second exhaust gas temperature Tg2.

When the first exhaust gas temperature Tg1 is higher than the predetermined first determining temperature Tc1 and the second exhaust gas temperature Tg2 is higher than the predetermined second determining temperature Tc2 and when the intake temperature Ta is higher than the predetermined third determining temperature Tc3, rise in the in-cylinder temperature and the temperature of the exhaust gas (first exhaust gas temperature) Tg1 exhausted from the cylinder is restricted by the third exhaust gas temperature rise control of the normal injection plus post injection more than in the case where the second exhaust gas temperature rise control is used, and rise of the engine cooling water temperature is restricted.

On the other hand, in the third exhaust gas temperature rise control, in the same manner as in the second exhaust gas temperature rise control, the HC is supplied into the exhaust gas using the post injection in addition to the normal injection so that the HC is oxidized by the oxidation catalyst to generate heat. By this heat generation, with the second exhaust gas temperature Tg2 higher than the second determining temperature Tg2, the exhaust gas flows into the DPF device. By the exhaust gas having a high temperature, the PM trapped in the filter device 12b with the catalyst is heated to the temperature to start burning the PM or above, and the PM is burned and removed.

Therefore, at the exhaust gas temperature rise of the regeneration control in the manual regeneration mode, when the HC is supplied into the exhaust gas by the post injection, by separately using the second exhaust gas temperature rise control of the "multi injection plus post injection" for raising the in-cylinder temperature and the third exhaust gas temperature rise control of the "normal injection plus post injection" for restricting rise of the in-cylinder temperature, rise in the in-cylinder temperature can be restricted in the regeneration control in the manual regeneration mode carried out when the vehicle is stopped and cooling efficiency of the radiator is lowered, and then, rise of a cooling water temperature Tw can be restricted.

As a result, the PM trapped by the filter device 12b with the catalyst can be forcedly burned and removed so as to forcedly regenerate the filter device 12b with the catalyst, and by restricting excessive rise of the in-cylinder temperature and the exhaust gas temperature exhausted to the exhaust passage 11, rise in the temperature of the engine cooling water is restricted without stopping the air conditioner, and possible overheat of the engine can be avoided.

The method for controlling the exhaust gas purification system and the exhaust gas purification system of the present invention having the above-mentioned excellent effects can be extremely effectively used for many internal combustion engines such as internal combustion engines mounted on vehicles.

What is claimed is:

1. A method for controlling an exhaust gas purification system which includes an exhaust gas purification device provided with an oxidation catalyst device and a diesel particulate filter device provided in order from an upstream side of an exhaust passage of an internal combustion engine, a detector for detecting a temperature of an exhaust gas and an intake temperature, and regeneration controller for carrying out regeneration control for recovering purification capacity of said diesel particulate filter device, accompanied by post injection in in-cylinder fuel injection control based on a detection result of said temperature detector; in an exhaust gas temperature rise control at said regeneration control at manual regeneration, comprising:

when a first exhaust gas temperature of the exhaust gas flowing into said oxidation catalyst device is lower than a predetermined first determining temperature, or when a second exhaust gas temperature of the exhaust gas flowing into said diesel particulate filter device is lower than a predetermined second determining temperature, first exhaust gas temperature rise control, carrying out multi injection in the in-cylinder fuel injection control is executed;

when said first exhaust gas temperature is higher than said predetermined first determining temperature and said second exhaust gas temperature is higher than said predetermined second determining temperature, and when the intake temperature is lower than a predetermined third determining temperature, second exhaust gas temperature rise control, carrying out post injection in addition to the multi injection in the in-cylinder fuel injection control is executed; and when said first exhaust gas temperature is higher than said predetermined first determining temperature and said second exhaust gas temperature is higher than said predetermined second determining temperature and when said intake temperature is higher than said predetermined third determining temperature, third exhaust gas temperature rise control, carrying out the post injection in addition to normal injection in the in-cylinder fuel injection control, is executed.

2. The method for controlling the exhaust gas purification system according to claim 1, wherein said first determining temperature is a catalyst activation temperature of an oxidation catalyst carried by said oxidation catalyst device, said second determining temperature is a predetermined temperature to prohibit the post injection in the exhaust gas temperature rise control at said regeneration control, and said third determining temperature is an intake temperature at which said second exhaust gas temperature cannot be kept higher than said predetermined second determining temperature when said second exhaust gas temperature rise control is switched to said third exhaust gas temperature rise control.

3. An exhaust gas purification system, comprising:

an exhaust gas purification device provided with an oxidation catalyst device and a diesel particulate filter device in an exhaust passage of an internal combustion engine, a detector for detecting a temperature of an exhaust gas and an intake temperature, and a regeneration controller for manual regeneration control, when a vehicle is stopped, in order to recover purification capacity of said diesel particulate filter device, said regeneration controller including a signal generator that issues respective signals to begin multi injection in in-cylinder fuel injection, when a first exhaust gas temperature of an exhaust gas flowing into said oxidation catalyst device is lower than a predetermined first determining temperature, or when a second exhaust gas temperature of the exhaust gas flowing into said diesel particulate filter device is lower than a predetermined second determining temperature, post injection in addition to the multi injection in the in-cylinder fuel injection, when said first exhaust gas temperature is higher than said predetermined first determining temperature and said second exhaust gas temperature is higher than said predetermined second determining temperature, and when an intake temperature is lower than a predetermined third determining temperature; and the post injection in addition to normal injection in the in-cylinder fuel injection, when said first exhaust gas temperature is higher than said predetermined first determining temperature and said second exhaust gas temperature is higher than said predetermined second determining temperature, and when said intake temperature is higher than said predetermined third determining temperature.

4. The exhaust gas purification system according to claim 3, wherein said first determining temperature is a catalyst activation temperature of an oxidation catalyst carried by said oxidation catalyst device, said second determining temperature is a predetermined temperature to prohibit the post injection in the exhaust gas temperature rise control at said regeneration control, and said third determining temperature is an intake temperature at which said second exhaust gas temperature cannot be kept higher than said predetermined second determining temperature, when said post injection in addition to said multi injection is switched to said post injection in addition to said normal injection.

* * * * *